3,022,154
CONCENTRATED LIQUID FERTILIZERS FROM SUPERPHOSPHORIC ACID AND POTASSIUM HYDROXIDE
John M. Potts, Henry W. Elder, and John Franklin Anderson, Jr., Florence, Ala., assignors to Tennessee Valley Authority, a corporation of the United States
Filed May 6, 1960, Ser. No. 27,457
7 Claims. (Cl. 71—34)
(Granted under Title 35, U.S. Code (1952), sec. 266)

The invention herein described may be manufactured and used by or for the Government for governmental purposes without the payment to us of any royalty therefor.

Our invention relates to an improvement in liquid mixed fertilizers high in percent $K_2O$ plant nutrient units, and more particularly to an improved process for their production.

Heretofore, liquid mixed fertilizers having compositions similar to those of standard dry mixed fertilizers have been well known; and such fertilizers are increasing in popularity in the industry. Such solutions have numerous advantages over dry mixed fertilizers in that the costs of evaporating moisture and the bagging operation are eliminated. Such liquid fertilizers greatly simplify the operation of applying plant nutrients to the soil. Moreover, the use of liquid fertilizers effectively eliminates the difficulties due to segregation and caking often encountered in storing dry fertilizers.

However, liquid fertilizers have, in the past, had some outstanding disadvantages. Raw-material costs have proven to be relatively high, and the solutions produced have been so corrosive as to result in high maintenance and storage costs. The liquid fertilizer solutions produced by the prior-art methods also have been limited to a maximum content of plant-food units of 33 weight percent. This upper limit of available plant nutrients in prior-art solutions results from the fact that solutions having concentrations in excess of this amount always have been found to crystallize and precipitate salts out of solution when stored at or below room temperature.

The desirability of low salting-out temperatures for liquid fertilizers is well recognized in the fertilizer industry, inasmuch as liquid fertilizers with high salting-out temperatures require special equipment to ensure that the materials remain in a liquid solution during storage. Furthermore, if such material salts out during either storage or handling, it becomes difficult to pump; and such material also plugs small discharge orifices in the equipment used in applying the fertilizer to the soil, so as to preclude its use on a practical basis. These disadvantages often outweigh the benefits derived from elimination of the evaporation and bagging steps involved in the preparation of conventional dry mixed fertilizers.

Our invention is directed to an improved process for producing a liquid mixed fertilizer containing in excess of 33 percent total plant nutrient units, which contains a high percentage of $K_2O$ units as available plant food and which does not crystallize or precipitate salts out of solution upon long storage at temperatures of about 32° F. We have found that liquid mixed fertilizers of the type described may be produced by our process, which comprises simultaneously introducing a stream of aqueous potassium hydroxide solution containing from about 40 to 67 percent KOH and a stream of superphosphoric acid containing from about 75 to 77 percent $P_2O_5$ into a reaction zone; therein rapidly and intimately mixing the streams with vigorous agitation at a temperature in the range of about 80° to 240° F.; controlling the ratio of introduction of each stream so as to maintain the pH in the reaction zone in the range from about 7.0 to 11.5; and withdrawing from the reaction zone a fertilizer solution stable at low temperatures containing from about 23 to 27 weight percent $P_2O_5$ and containing from about 23 to 36 weight percent $K_2O$.

In U.S. Letters Patent 2,950,961, Marcus M. Striplin, Jr., et al., assigned to the assignee of the present invention, there is disclosed apparatus similiar to the reaction and mixing apparatus which we have found to be effective in carrying out our process. The above-mentioned application of Striplin et al. also describes a process for the ammoniation of superphosphoric acid to produce a solution in which the total ($N+P_2O_5$) units ordinarily obtained will be in the range from 33 to about 60 weight percent. This process gives good results when a liquid fertilizer material, high in nitrogen content, is desired; but it cannot be used when a maximum concentration of available $K_2O$ is required. The desirability of having available $K_2O$ in a liquid fertilizer has been recognized and shown in Striplin et al. in that $KCO_3$ (potash) and KCl may be added in a second mixing vessel after the ammoniation step. However, this process yields material having a maximum of only 7 units of $K_2O$ (i.e., 7–21–7 grade).

In our process, we do not incorporate an ammoniation step, and the liquid fertilizer material produced by our process may contain in excess of 5 times as many units of $K_2O$ (i.e., 0–27–36 grade) as shown in Striplin et al. In our process we produce a fertilizer solution in which the total ($P_2O_5+K_2O$) units of plant nutrients ordinarily will be in the range from about 50 to 60 weight percent.

Typical grades of solutions produced by the present process are 0–27–36, 0–25–25, and 0–29–31. We have found that the solutions extracted from the reaction zone may be used directly as a liquid fertilizer or, if desirable, may be subsequently mixed with a suitable source of nitrogen-bearing material such as urea, ammonium nitrate, diammonium phosphate, or mixtures thereof, and water, to produce solutions of such grades as 12–12–12 and 13–13–13.

The term "superphosphoric acid" as used in this specification and claims is defined as a phosphoric acid containing quantities of both ortho- and polyphosphoric acids. The polyphosphoric acids include pyrophosphoric acid and other polymers from the tri- to the nonapolymer and higher. The properties of polyphosphoric acids vary with the $P_2O_5$ content of the superphosphoric acid. The Canadian Journal of Chemistry, vol. 34 (1956), pages 790 and 791, shows that superphosphoric acid in the range from about 75 to 77 percent $P_2O_5$ contains about 56 to 40 percent orthophosphoric acid, about 39 to 47 percent pyrophosphoric acid, about 5 to 11 percent tripolyphosphoric acid, and up to about 2 percent of the tetrapolymer of phosphoric acid.

Superphosphoric acid may be prepared by dissolving quantities of $P_2O_5$ in orthophosphoric acid, by evaporating water from orthophosphoric acid, or by operating equipment ordinarily used for the manufacture of orthophosphoric acid from phosphorus at higher temperatures than is normal in the manufacture of orthophosphoric acid, so as to react less water with the $P_2O_5$ produced.

It is an object of our invention to provide improved stable liquid mixed fertilizers containing well in excess of 33 percent total available plant food in which the number of units of available K₂O is at least proportionately equal to the number of units of P₂O₅.

Another object of our invention is to provide liquid mixed fertilizers containing substantially more than 33 percent total plant food in which the number of units of available K₂O is at least proportionately equal to the number of units of P₂O₅ and in which no crystallization or precipitation occurs on long storage.

Still another object of our invention is to provide liquid mixed fertilizers containing substantially more than 33 percent total plant food in which the number of units of available K₂O is at least proportionately equal to the number of units of P₂O₅ and in which no crystallization or precipitation occurs on long storage, and which are easily pumpable, have low viscosity, and possess greatly reduced corrosive characteristics.

A further object of our invention is to provide a process for the manufacture of liquid mixed fertilizers containing substantially more than 33 percent total plant food in which the number of units of available K₂O is at least proportionately equal to the number of units of P₂O₅ and in which no crystallization or precipitation occurs on long storage; the process being characterized by simplicity, economy, and utilization of relatively inexpensive equipment.

In carrying out the objects of our invention in one form thereof, we employ a reactor vessel and other equipment which is similar in design to that shown in the aforementioned Striplin et al. application. We have found it most economical to employ this type of equipment for both batch and continuous mixing operations.

Our invention, together with further objects and advantages thereof, will be better understood from a consideration of the following description taken in connection with the accompanying drawings in which.

Figure 1:
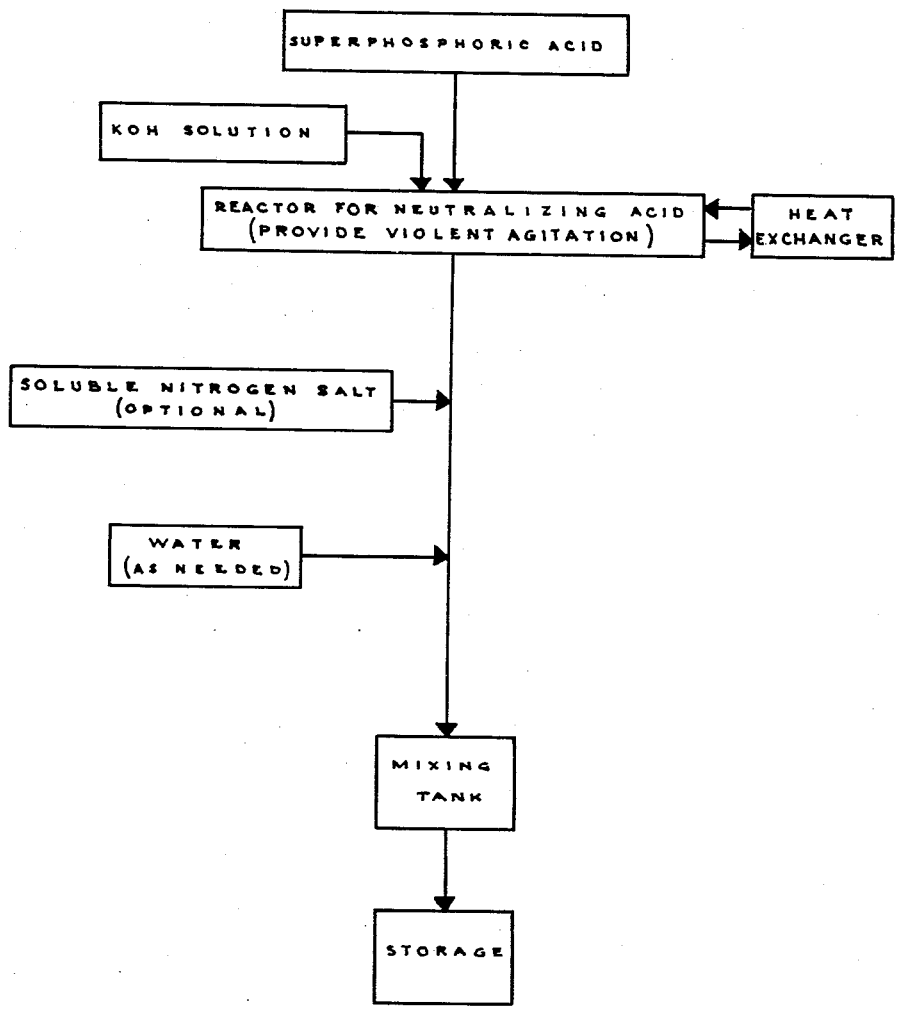
FIGURE 1 is a flow sheet illustrating principles of our novel process which results in a liquid fertilizer having the properties mentioned above.
Figure 2:
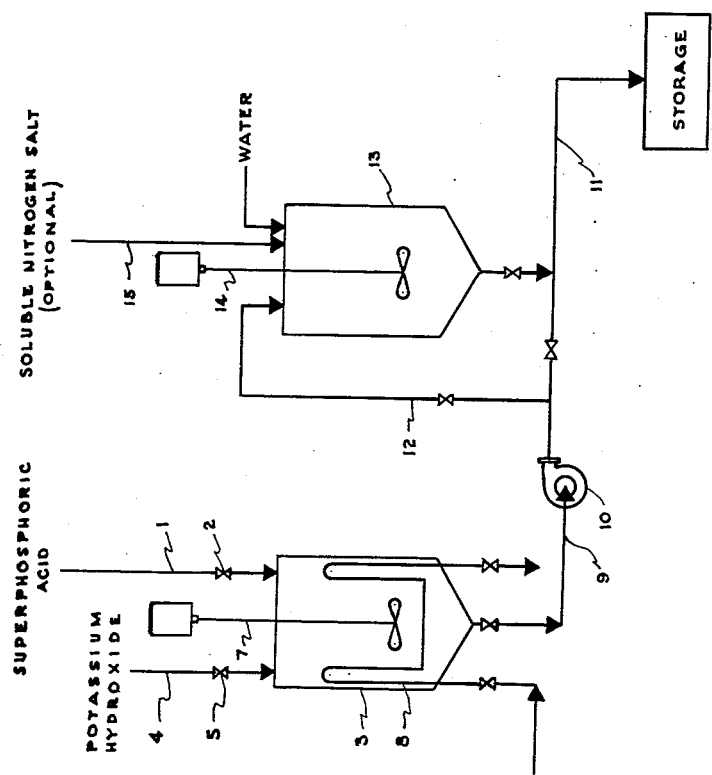
FIGURE 2 is a diagrammatical illustration showing the flow of materials in the carrying out of our process.

Referring now more specifically to FIGURE 2, superphosphoric acid from a source not shown is fed through line 1 and any suitable means for controlling the rate of flow 2 into a reaction zone comprising vessel 3. Potassium hydroxide from a source not shown is fed into vessel 3 through line 4 containing means for controlling the rate of flow 5. Vessel 3 is equipped with a motor-driven agitator 7 running at such speed as to secure rapid and intimate mixing of acid and potassium hydroxide to keep the resulting mixture in vigorous agitation until reaction is complete. Cooling coils 8 are located within vessel 3 and preferably are disposed in a bafflelike arrangement to increase the degree of agitation resulting from the action of agitator 7. We prefer to introduce a stream of superphosphoric acid at a steady rate of flow according to the capacity of the equipment, and to vary the rate of introduction of potassium hydroxide as may be necessary to maintain the desired ranges of specific gravity and pH of the material in the reactor.

The temperature of the reacting mixture is maintained in the range from about 80° F. to 240° F. by circulating a suitable coolant through coils 8. Preferably, the temperature of the reacting mixture is maintained in the range from about 80° F. to 180° F. when producing a grade from which no water must be evaporated.

Once the potassium salts are formed, the resulting solution, having a specific gravity above 1.4 at 80° F., remains clear and stable for many weeks at ordinary room temperature; and there is no precipitation even though the solution is cooled to about 32° F. and stored at this temperature for more than a month. Finished solution drawn from vessel 3 and line 9 by pump 10 may be withdrawn as product via line 11 when grades of fertilizer such as 0-27-36, 0-23-23, and 0-29-31, containing no appreciable nitrogen, are desired.

When it is desired to produce a liquid fertilizer which does contain nitrogen, the solution is passed via line 12 to a suitable mixing vessel 13 equipped with agitator 14. A source of nitrogen-bearing material is introduced at 15 and is dissolved in the solution by agitation. We have found that a number of soluble nitrogen salts, as well as urea, may be used as a source of the nitrogen. Among these salts we have found that ammonium nitrate and diammonium phosphate, which are stable in the required pH range, have proven satisfactory. From such materials we have prepared such grades as 5–20–20, 12–12–12, and 13–13–13. These solutions have remained clear for 4 weeks at room temperature and at 32° F.

We have found that the reaction between superphosphoric acid and potassium hydroxide is very rapid, but a long mixing time may be used without any deleterious effect. Also, we have found that although hydrolysis of the superphosphoric acid occurs when the acid stands for some time in contact with water, there is substantially no hydrolysis under the conditions described above.

Potassium salts or ortho-, pyro-, and the other polyphosphoric acids are formed in substantially the same proportions in which these acids are present in the feed. Thus, when superphosphoric acid in the range from about 75 to 77 percent P₂O₅ content is utilized under conditions where there is substantially no hydrolysis of the acid, the resulting potassium salts will be in substantially the same proportions to one another as were the acids present in the feed. The resulting composition may be better understood from a consideration of the following chemical formula structures.

The structures for the ortho- and polyphosphoric acids in the feed which are present in the range from about 75 to 77 percent P₂O₅ are represented as follows:

| Orthophosphoric acid (56 to 40%) | Pyrophosphoric acid (39 to 47%) | Tripolyphosphoric acid (5 to 11%) | Tetrapolyphosphoric acid (up to 2%) |
|---|---|---|---|
| OH<br>\|<br>O=P—OH<br>\|<br>OH | OH<br>\|<br>O=P—OH<br>\|<br>O<br>\|<br>O=P—OH<br>\|<br>OH | OH<br>\|<br>O=P—OH<br>\|<br>O<br>\|<br>O=P—OH<br>\|<br>O<br>\|<br>O=P—OH<br>\|<br>OH | OH<br>\|<br>O=P—OH<br>\|<br>O<br>\|<br>O=P—OH<br>\|<br>O<br>\|<br>O=P—OH<br>\|<br>O<br>\|<br>O=P—OH<br>\|<br>OH |

The structures for the resulting potassium salts of the unhydrolyzed polyphosphoric acids are represented as follows:

| Orthophosphoric acid (≅56 to 40%) | Pyrophosphoric acid (≅39 to 47%) | Tripolyphosphoric acid (≅5 to 11%) | Tetrapolyphosphoric acid (up to 2%) |
|---|---|---|---|
| OK<br>\|<br>O=P—OK<br>\|<br>OK | OK<br>\|<br>O=P—OK<br>\|<br>O<br>\|<br>O=P—OK<br>\|<br>OK | OK<br>\|<br>O=P—OK<br>\|<br>O<br>\|<br>O=P—OK<br>\|<br>O<br>\|<br>O=P—OK<br>\|<br>OK | OK<br>\|<br>O=P—OK<br>\|<br>O<br>\|<br>O=P—OK<br>\|<br>O<br>\|<br>O=P—OK<br>\|<br>O<br>\|<br>O=P—OK<br>\|<br>OK |

In order that those skilled in the art may better understand how the present invention can be practiced, the following examples are given by way of illustration and not by way of limitation.

EXAMPLE I

A pilot plant was constructed as shown in the attached drawing. The capacity of the pilot plant was about 6 gallons, and it was equipped with an air-driven agitator which provided violent mixing and with coils which could be cooled with water or heated with steam, as desired. The coils were arranged near the wall of the vessel with the planes of the coils disposed radially, thus exerting a baffling action that increased the mixing action of the agitator.

The procedure in the pilot plant was similar to the so-called "semicontinuous" procedure which is practiced in many commercial liquid fertilizer plants. This procedure involves simultaneous feeding of most of the reactants, and batchwise discharge of the reactor when it is filled.

The usual procedure in the pilot plant was to feed superphosphoric acid having a concentration from 75 to 77 percent $P_2O_5$ into the top of the reactor through a vertical line, and to feed potassium hydroxide solution containing approximately 45 percent KOH simultaneously through a similar line. The two liquids were measured from "weigh" tanks, and the feed rates were controlled by restrictions in the feed lines. The reactor was set on scales; and water, based on this scale weight, was added or evaporated by steam-heating to adjust each reactor full of product to the desired concentration.

A large number of runs were made using the procedure described above. The following are typical of the results obtained in producing solutions of approximately 0–23–23 and 0–27–36 grades.

| Grade | 0-23-23 | 0-27-36 |
|---|---|---|
| Temperature of mixing, ° F | 182 | 236 |
| pH of final solution | 7.0 | 11.1 |
| Production rate, gallon/hour | 15.0 | 13.8 |
| Specific gravity of final solution at 80° F | 1.420 | 1.785 |
| Total $K_2O$ in final solution, percent by weight | 23.4 | 36.6 |
| Total $P_2O_5$ in final solution, percent by weight | 23.2 | 26.7 |
| Orthophosphate $P_2O_5$ in final solution, percent by weight | 14.5 | 18.0 |
| Total quantity made, gallons | 15 | 10 |

When 45 percent potassium hydroxide solution was used, as was usually the case, it was necessary to add a small amount of water to make a 0–23–23 grade solution and to evaporate water to make a 0–27–36 grade solution. When no water was added or evaporated, the grade was about 0–24.5–24.5.

Samples of all solutions were stored at temperatures from 28° F. to 32° F. for at least a month. No crystallization occurred. The solutions remained clear, almost water-white, and of relatively low viscosity.

EXAMPLE II

Runs were made to test the feasibility of preparing finished solutions containing all three of the major plant nutrients in a single vessel. Superphosphoric acid and potassium hydroxide solution were fed as described in Example I. A weighed amount of prilled urea was discharged into the reactor when introduction of these liquids was almost complete. Water was then added to adjust to the desired total weight. The following results were obtained in one run.

Temperature of mixing, ° F _____ 180
pH of final solution _____ 12.1
Production rate, gallons/hour _____ 13.2
Specific gravity of final solution at 87° F _____ 1.365
Total N in final solution, percent by weight _____ 6.4
Total $P_2O_5$ in final solution, percent by weight ___ 12.0
Total $K_2O$ in final solution, percent by weight ____ 18.75
Orthophosphate $P_2O_5$ in final solution, percent by weight _____ 6.7
Total quantity made, gallons _____ 11.0

This run and several others gave excellent results and yielded solutions that were stable and in which no precipitates formed on long standing.

EXAMPLE III

It was determined experimentally that solutions more concentrated in total plant food could be made from superphosphoric acid and potassium hydroxide if the pH was increased to more than the neutral pH of 7.0 which resulted in a 0:1:1 nutrient ratio. Tests were made to determine whether this increase in total plant food content could be attained by increasing the pH with ammonia and maintaining the nutrient ratio at $x$:1:1. Superphosphoric acid and potassium hydroxide solution were fed as described in Example I. The following results were obtained in one test.

Temperature of mixing, ° F. _____ 220
pH of final solution _____ 8.2
Production rate, gallons/hour _____ 13.6
Total N in final solution, percent by weight _____ 1.3
Total $P_2O_5$ in final solution, percent by weight ___ 29.0
Total $K_2O$ in final solution, percent by weight ____ 28.8
Orthophosphate $P_2O_5$ in final solution, percent by weight _____ 20.3
Total quantity made, gallons _____ 15

The product (1–29–29 grade) withstood storage satisfactorily for at least a month at 28° F. to 32° F. The maximum grade with a 0:1:1 ratio which withstood such storage was about 0–25–25.

EXAMPLE IV

Data were obtained which indicated, for the nutrient ratios studied, the maximum fertilizer grades made from superphosphoric acid and potassium hydroxide which salted out below 32° F. Small-scale tests were made to obtain supplemental data for some of these ratios. The tests were made in duplicate in 750-gram batches. A 600-ml. beaker provided with a mechanical stirrer was used as a mixing vessel. An ice-water bath was provided to control the reaction temperature below 180° F. All liquids introduced into the reaction vessel were measured in burets of the type used in titrations. The solids were weighed on gram balances.

In calculating the formulations, it was assumed, based on past experience, that 1 unit of $P_2O_5$ would be neutralized by 1 unit of $K_2O$ as potassium hydroxide. In most tests in which the requirement of superphosphoric acid was more than that which would neutralize the potassium hydroxide, the acid ($P_2O_5$), for convenience, was added as 11–33–0 solution, which is essentially neutral. In general practice, acid probably would be used in the formulations. Requirements for acid for some of these formulations are shown in Table 1.

The potassium hydroxide solution was added to the beaker first and violent agitation was provided while the superphosphoric acid, water, and, if needed, the 11–33–0 grade solution were added.

Table 1

| 0:1:1 grades | Formulation, lb./ton | | | Temperature, °F. | | Crystalline phase | Crystallized during storage for 1 wk. at 32° F. | pH | Specific gravity at 85° F. |
|---|---|---|---|---|---|---|---|---|---|
| | $H_3PO_4$, 76% $P_2O_5$ | KOH, 45% | $H_2O$ | Salt out | Saturation | | | | |
| 0-23-23 | 605 | 1,220 | 175 | −3 | −2 | $H_2O$ | No | 7.0 | 1.504 |
| 0-24-24 | 632 | 1,273 | 95 | −8 | −6 | $H_2O$ | No | 7.1 | 1.532 |
| 0-25-25 | 658 | 1,326 | 16 | −14 | −13 | $H_2O$ | No | 7.1 | 1.551 |
| 0-26-26 [1] | 684 | 1,316 | | Room temp. | | $KH_2PO_4$ | Yes | 6.8 | 1.501 |
| 0-23.4-22.6 | 616 | 1,199 | 185 | −1 | 1 | $H_2O$ | No | | 1.504 |
| 0-22.6-23.4 | 595 | 1,241 | 164 | −4 | −3 | $H_2O$ | No | 7.3 | |

[1] 47 percent KOH solution was used.

Salting-out temperatures were determined by cooling at a rate of 4° F. per hour until crystals formed. Saturation temperatures were determined by warming at the same rate until the crystals dissolved.

EXAMPLE V

In initial attempts to produce highly concentrated potassium polyphosphate solutions, water, and solid pellets of 85 percent KOH were added to superphosphoric acid. Reaction of the pellets with the acid was difficult to start, and once started, it was difficult to control, and large temperature rises could not be avoided even though the reaction was carried out in an ice bath. Various procedures such as preheating the superphosphoric acid and providing violent agitation were tried unsuccessfully. Finally, it was found that the potassium hydroxide pellets could be dissolved at a temperature of 250° to 280° F. in the water needed for formation of the liquid fertilizer, and that this potassium hydroxide solution reacted instantly with the superphosphoric acid. With this procedure the reaction temperature could be easily controlled.

The manner of obtaining the solution of potassium hydroxide is not pertinent to the present invention. In commercial practice the solution may be purchased as such or prepared by dissolving solid potassium hydroxide in any convenient manner.

The concentration of the potassium hydroxide solution is of importance insofar as it affects the concentration of the final solution. In many experiments, solutions containing 67 percent KOH were used in the reactor with superphosphoric acid to make a 0-27-36 base solution. In using this 67 percent solution, it was observed that it should be used at temperatures above room temperature to ensure complete dissolving of the KOH. Obviously, the process is not limited to use in a 0-27-36 grade base solution. A solution containing 40 percent KOH was found to be easily handled and stored at room temperature and is so concentrated as to make grades such as 0-23-23, 5-20-20, and 12-12-12. The physical properties of such grades made from a 40 percent KOH solution were observed to be about the same as a similar grade produced from a 0-27-36 base solution.

What we claim as new and desire to secure by Letters Patent of the United States is:

1. A process for the production of a temperature-stable fertilizer solution having a salting-out temperature below 32° F. which comprises the steps of simultaneously introducing a stream of superphosphoric acid containing from about 75 to about 77 percent $P_2O_5$ and a stream of aqueous potassium hydroxide containing from about 40 to about 67 percent KOH into a reaction zone; mixing in said reaction zone said streams with vigorous agitation; respectively maintaining the temperature of the materials in said reaction zone in the range of about 80° F. to 240° F.; controlling the ratio of introduction of each of said streams so as to maintain the pH in said reaction zone in the range from about 7.0 to 11.5; and withdrawing from said reaction zone a temperature-stable fertilizer solution containing from about 23 to 27 weight percent $P_2O_5$ and from about 23 to 36 weight percent $K_2O$.

2. A process for the production of a temperature-stable fertilizer solution having a salting-out temperature below 32° F. which comprises the steps of simultaneously introducing a stream of superphosphoric acid containing from about 75 to about 77 percent $P_2O_5$ and a stream of aqueous potassium hydroxide containing about 67 percent KOH at a temperature in the range from about 250° F. to 280° F. into a reaction zone; mixing in said reaction zone said streams with vigorous agitation; respectively maintaining the temperature of the materials in said reaction zone in the range of about 80° F. to 240° F.; controlling the ratio of introduction of each of said streams so as to maintain the pH in said reaction zone in the range from about 7.0 to 11.5; and withdrawing from said reaction zone a temperature-stable fertilizer solution containing about 27 weight percent $P_2O_5$ and about 36 weight percent $K_2O$.

3. A process for the production of a temperature-stable fertilizer solution having a salting-out temperature below 32° F. which comprises the steps of simultaneously introducing a stream of superphosphoric acid containing from about 75 to about 77 percent $P_2O_5$ and a stream of aqueous potassium hydroxide containing about 40 percent KOH into a reaction zone; mixing in said reaction zone said streams with vigorous agitation; respectively maintaining the temperature of the materials in said reaction zone in the range of about 80° F. to 240° F.; controlling the ratio of introduction of each of said streams so as to maintain the pH in said reaction zone in the range from about 7.0 to 11.5; and withdrawing from said reaction zone a temperature-stable fertilizer solution containing about 23 weight percent $P_2O_5$ and about 23 weight percent $K_2O$.

4. A process for the production of a temperature-stable fertilizer solution having a salting-out temperature below 32° F. which comprises the steps of simultaneously introducing a stream of superphosphoric acid containing from about 75 to about 77 percent $P_2O_5$ and a stream of aqueous potassium hydroxide containing from about 40 to about 67 percent KOH into a reaction zone; mixing in said reaction zone said streams with vigorous agitation; respectively maintaining the temperature of the materials in said reaction zone in the range of about 80° F. to 240° F.; controlling the ratio of introduction of each of said streams so as to maintain the pH in said reaction zone in the range from about 7.0 to 11.5; withdrawing from said reaction zone a temperature-stable fertilizer solution containing from about 23 to 27 weight percent $P_2O_5$ and from about 23 to 36 weight percent $K_2O$; and adding to said withdrawn fertilizer a material selected from the group consisting of ammonium nitrate, diammonium phosphate, urea, and mixtures thereof in quantity sufficient to produce a fertilizer having a grade in the range from 5-20-20 to 12-12-12.

5. A stable, substantially noncorrosive liquid mixed fertilizer of low viscosity having a pH range of about 7.0 to 11.5, containing from about 46 to about 63 weight percent total ($P_2O_5 + K_2O$), the number of units of available $K_2O$ being at least proportionally equal to the number of units of $P_2O_5$, consisting essentially of an aqueous solution of potassium salts of superphosphoric acid in which the total $P_2O_5$ content is distributed in the following proportions: 56 to 40 percent as potassium orthophosphate, 39 to 47 percent as potassium pyrophosphate, 5 to 11 percent as potassium tripolyphosphate, and in amounts up to 2 percent as potassium tetrapolyphosphate.

6. A stable, substantially noncorrosive liquid mixed fertilizer of low viscosity having a pH range of about 7.0 to 11.5, containing about 23 weight percent $P_2O_5$ and about 23 weight percent $K_2O$, consisting essentially of an aqueous solution of potassium salts of superphosphoric acid in which the total $P_2O_5$ content is distributed in the following proportions: 56 to 40 percent as potassium orthophosphate, 39 to 47 percent as potassium pyrophosphate, 5 to 11 percent as potassium tripolyphosphate, and in amounts up to 2 percent as potassium tetrapolyphosphate.

7. A stable, substantially noncorrosive liquid mixed fertilizer of low viscosity having a pH range of about 7.0 to 11.5, containing about 27 weight percent $P_2O_5$ and about 36 weight percent $K_2O$, consisting essentially of an aqueous solution of potassium salts of superphosphoric acid in which the total $P_2O_5$ content is distributed in the following proportions: 56 to 40 percent as potassium orthophosphate, 39 to 47 percent as potassium pyrophosphate, 5 to 11 percent as potassium tripolyphosphate, and in amounts up to 2 percent as potassium tetrapolyphosphate.

References Cited in the file of this patent
UNITED STATES PATENTS
2,950,961    Striplin et al. _____ Aug. 30, 1960

UNITED STATES PATENT OFFICE
CERTIFICATE OF CORRECTION

Patent No. 3,022,154  February 20, 1962

John M. Potts et al.

It is hereby certified that error appears in the above numbered patent requiring correction and that the said Letters Patent should read as corrected below.

Column 4, second table thereof, the headings should appear as shown below instead of as in the patent:

| Potassium orthophosphate ($\cong$ 56 to 40%) | Potassium pyrophosphate ($\cong$ 39 to 47%) | Potassium tripolyphosphate ($\cong$ 5 to 11%) | Potassium tetrapolyphosphate (up to 2%) |
|---|---|---|---|

Signed and sealed this 19th day of June 1962.

(SEAL)
Attest:

ERNEST W. SWIDER
Attesting Officer

DAVID L. LADD
Commissioner of Patents